(12) United States Patent
Hirano et al.

(10) Patent No.: US 12,109,748 B2
(45) Date of Patent: Oct. 8, 2024

(54) OPERATION QUANTITY DETERMINATION DEVICE, MOLDING APPARATUS SYSTEM, MOLDING MACHINE, NON-TRANSITORY COMPUTER READABLE RECORDING MEDIUM, OPERATION QUANTITY DETERMINATION METHOD, AND STATE DISPLAY DEVICE

(71) Applicant: The Japan Steel Works, Ltd., Tokyo (JP)

(72) Inventors: Takayuki Hirano, Tokyo (JP); Akira Morii, Tokyo (JP); Takashi Akagi, Tokyo (JP); Akihiko Saeki, Tokyo (JP); Yuta Ashihara, Tokyo (JP); Pichai Kankuekul, Tokyo (JP)

(73) Assignee: The Japan Steel Works, Ltd., Tokyo (JP)

( * ) Notice: Subject to any disclaimer, the term of this patent is extended or adjusted under 35 U.S.C. 154(b) by 316 days.

(21) Appl. No.: 17/765,163

(22) PCT Filed: Sep. 28, 2020

(86) PCT No.: PCT/JP2020/036571
§ 371 (c)(1),
(2) Date: Mar. 30, 2022

(87) PCT Pub. No.: WO2021/065779
PCT Pub. Date: Apr. 8, 2021

(65) Prior Publication Data
US 2022/0339837 A1    Oct. 27, 2022

(30) Foreign Application Priority Data
Oct. 4, 2019   (JP) ................. 2019-184088

(51) Int. Cl.
*B29C 45/76*    (2006.01)
*G05B 13/02*    (2006.01)

(52) U.S. Cl.
CPC ........ *B29C 45/768* (2013.01); *G05B 13/0265* (2013.01); *B29C 2045/7606* (2013.01);
(Continued)

(58) Field of Classification Search
None
See application file for complete search history.

(56) References Cited

U.S. PATENT DOCUMENTS 5,550,744 A    8/1996  Steinbichler
10,416,617 B2  9/2019  Shiraishi et al.
(Continued)

FOREIGN PATENT DOCUMENTS

CN    106393618 A    2/2017
CN    109693354 A    4/2019
(Continued)

OTHER PUBLICATIONS

Office Action for Taiwan Application No. 11221226850 mailed on Dec. 5, 2023, with its English Translation, 20 pages.
(Continued)

*Primary Examiner* — Ryan A Jarrett
(74) *Attorney, Agent, or Firm* — Bret E. Field; Bozicevic, Field & Francis LLP

(57) ABSTRACT

An operation quantity determination device for determining an operation quantity related to a molding machine, includes an observation unit configured to acquire observation data obtained by observing a physical quantity related to molding by the molding machine when the molding is executed, a
(Continued)

state expression unit configured to generate a state expression map expressing a state of the molding machine based on the observation data acquired by the observation unit, and an operation quantity output unit configured to output the operation quantity based on the state expression map generated by the state expression unit.

22 Claims, 13 Drawing Sheets

(52) U.S. Cl.
CPC ............... *B29C 2945/76163* (2013.01); *B29C 2945/76167* (2013.01)

(56) References Cited

U.S. PATENT DOCUMENTS

| | | | |
|---|---|---|---|
| 10,618,202 B2 | 4/2020 | Maruyama | |
| 2004/0093115 A1 | 5/2004 | Usui et al. | |
| 2017/0031330 A1 | 2/2017 | Shiraishi et al. | |
| 2017/0274571 A1 | 9/2017 | Altonen et al. | |
| 2018/0314242 A1 | 11/2018 | Hirose et al. | |
| 2019/0019087 A1 | 1/2019 | Fukui | |
| 2019/0118443 A1 | 4/2019 | Asaoka et al. | |
| 2021/0001526 A1 | 1/2021 | Hirano et al. | |

FOREIGN PATENT DOCUMENTS

| | | |
|---|---|---|
| DE | 4025221 A1 | 2/1992 |
| DE | 19518804 A1 | 12/1995 |
| EP | 0756219 A2 | 1/1997 |
| JP | 6294268 B2 | 3/2018 |
| JP | 6346128 B2 | 6/2018 |
| JP | 2018-185733 A | 11/2018 |
| JP | 2019-166702 A | 10/2019 |
| WO | WO2017163538 A1 | 9/2017 |
| WO | WO2018217903 A1 | 11/2018 |
| WO | WO2019234907 A1 | 12/2019 |

OTHER PUBLICATIONS

Extended European Search Report for European Application No. 20871787.6 mailed on Oct. 18, 2023, 8 pages.

Office Action for Taiwan Application No. 109134102 mailed on Dec. 5, 2023, with its English Translation, 20 pages.

English Translation of International Search Report for PCT Application No. PCT/JP2020/036571 mailed Dec. 15, 2020, 2 pages.

ND STATE
OPERATION QUANTITY DETERMINATION DEVICE, MOLDING APPARATUS SYSTEM, MOLDING MACHINE, NON-TRANSITORY COMPUTER READABLE RECORDING MEDIUM, OPERATION QUANTITY DETERMINATION METHOD, AND STATE DISPLAY DEVICE

CROSS-REFERENCE TO RELATED APPLICATIONS

This application is the national phase under 35 U. S. C. § 371 of PCT International Application No. PCT/JP2020/036571 which has an International filing date of Sep. 28, 2020 and designated the United States of America.

FIELD

The present disclosure relates to an operation quantity determination device, a molding apparatus system, a molding machine, a computer program, an operation quantity determination method, and a state display device.

BACKGROUND

Japanese Patent No. 6346128 discloses an injection molding apparatus system and a machine learning device for determining an optimum operating condition having low power consumption by a reinforcement learning device and adjusting the operating condition.

Patent Japanese Patent No. 6294268 discloses an abnormality diagnosis apparatus for diagnosing an abnormality in an injection molding machine by machine learning.

However, the injection molding apparatus system according to Japanese Patent No. 6346128 is a system in which the operation quantity of a molding machine is determined by model-free reinforcement learning, and when the environment changes, a policy for determining the operation quantity may not be applicable. In this case, it is necessary to relearn the policy from scratch. Learning the policy requires a huge amount of training data or training work, and has a problem of lacking versatility.

The apparatus of Patent Japanese Patent No. 6294268 may perform an abnormality diagnosis of injection molding. However, the apparatus cannot determine an optimum operation quantity of a molding machine.

SUMMARY

An object of the present disclosure is to provide an operation quantity determination device, a molding apparatus system, a molding machine, a computer program, an operation quantity determination method, and a state display device excellent in robustness against environmental changes and capable of performing additional learning for adapting to a new environment in a short time.

An operation quantity determination device of an aspect of the present disclosure is the operation quantity determination device for determining an operation quantity related to a molding machine, the device comprising: an observation unit configured to acquire observation data obtained by observing a physical quantity related to molding by the molding machine when the molding is executed; a state expression unit configured to generate a state expression map expressing a state of the molding machine based on the observation data acquired by the observation unit; and an operation quantity output unit configured to output the operation quantity based on the state expression map generated by the state expression unit.

A molding apparatus system of an aspect of the present disclosure is the molding apparatus system, comprising: the above operation quantity determination device; and a molding machine.

A molding machine of an aspect of the present disclosure is the molding machine, comprising the above operation quantity determination device, wherein the molding machine operates based on the operation quantity determined by the operation quantity determination device.

A computer program of an aspect of the present disclosure is the computer program for causing a computer to determine an operation quantity related to a molding machine, the computer program causing the computer to execute processes of acquiring observation data obtained by observing a physical quantity related to molding by the molding machine when the molding is executed; generating a state expression map expressing a state of the molding machine based on the acquired observation data; and outputting the operation quantity based on the generated state expression map.

A operation quantity determination method of an aspect of the present disclosure is the operation quantity determination method for determining an operation quantity related to a molding machine, the method comprising: acquiring observation data obtained by observing a physical quantity related to molding by the molding machine when the molding is executed; generating a state expression map expressing a state of the molding machine based on the acquired observation data; and outputting the operation quantity based on the generated state expression map.

A state display device of an aspect of the present disclosure is the state display device, comprising: an observation unit configured to acquire observation data obtained by observing a physical quantity related to molding by the molding machine when the molding is executed; and a display processing unit configured to display a map image related to a state expression map expressing a state of the molding machine based on the observation data acquired by the observation unit and an actual molding result by the molding machine so that the map image and the actual molding result are allowed to be compared with each other.

According to the above disclosure, robustness against environmental changes is excellent, and additional learning for adapting to a new environment may be performed in a short time.

The above and further objects and features will more fully be apparent from the following detailed description with accompanying drawings.

DETAILED DESCRIPTION

Hereinafter, specific examples of an operation quantity determination device, a molding apparatus system, a molding machine, a computer program, an operation quantity determination method, and a state display device according to embodiments of the present disclosure will be described below with reference to the drawings. At least some of the embodiments described below may be optionally combined. It should be noted that the invention is not limited to these examples, is indicated by the scope of claims, and is intended to include all modifications within the meaning and scope equivalent to the scope of claims.

First Embodiment

Figure 1:
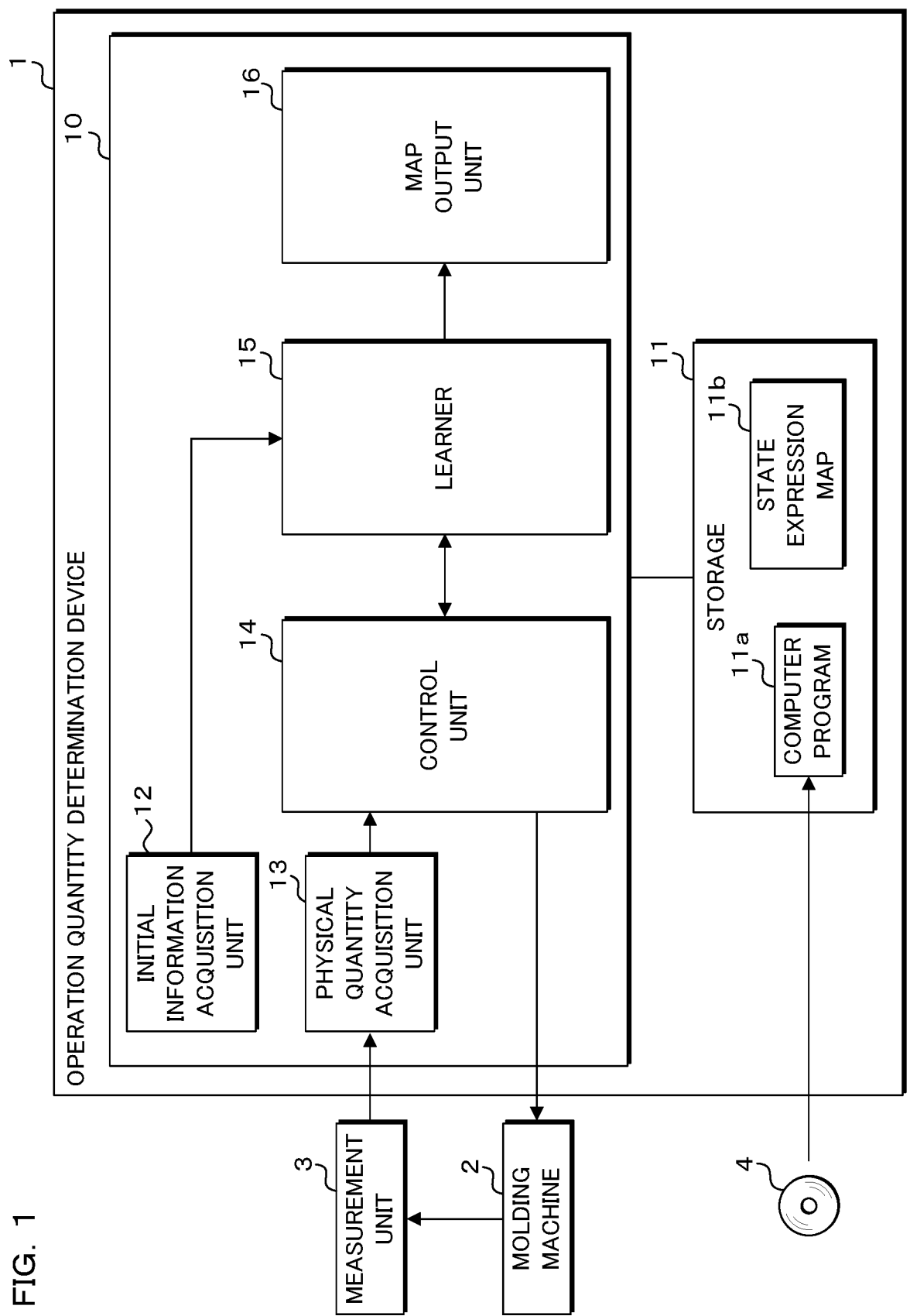
FIG. 1 is a block diagram illustrating a configuration example of a molding apparatus system according to a first embodiment.
Figure 2:
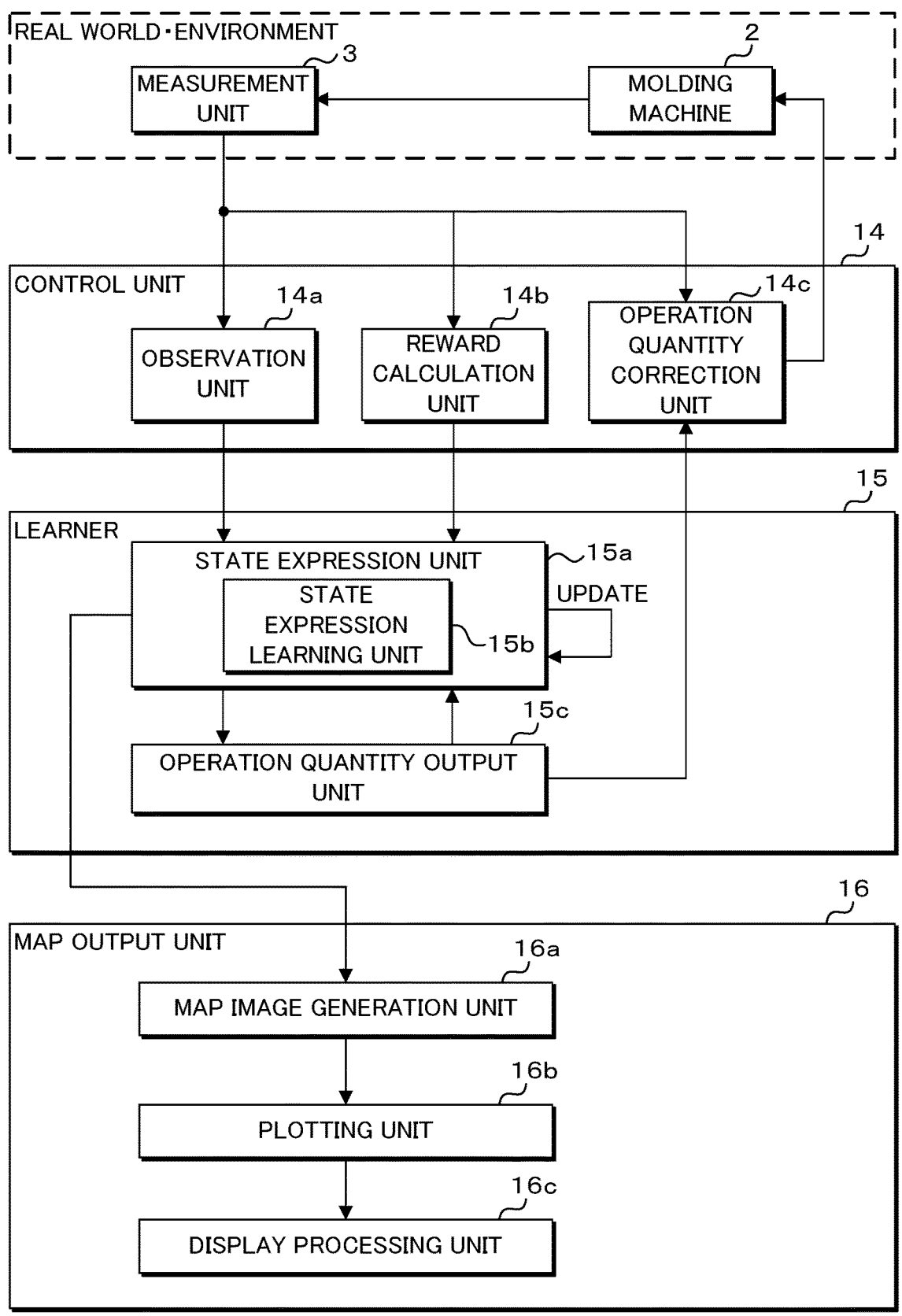
FIG. 2 is a functional block diagram of the molding apparatus system according to the first embodiment.

FIG. 1 is a block diagram illustrating a configuration example of a molding apparatus system according to a first embodiment, and FIG. 2 is a functional block diagram of the molding apparatus system according to the first embodiment.

The molding apparatus system according to the first embodiment includes an operation quantity determination device 1, a molding machine 2, and a measurement unit 3. The operation quantity determination device 1 further functions as a state display device.

The molding machine 2 is, for example, an injection molding machine, a hollow molding machine, a film forming machine, an extruder, a twin-screw extruder, a spinning extruder, a granulator, a magnesium injection molding machine, etc. Hereinafter, in the first embodiment, a description will be given on the assumption that the molding machine 2 is the injection molding machine. The injection molding machine includes an injection device and a mold clamping device disposed in front of the injection device. The injection device includes a heating cylinder, a screw that may be driven in a rotational direction and an axial direction in the heating cylinder, a rotary motor that drives the screw in the rotational direction, a motor that drives the screw in the axial direction, etc. The mold clamping device includes a toggle mechanism that opens and closes a mold and tightens the mold so that the mold does not open when a molten resin injected from the injection device fills the mold, and a motor that drives the toggle mechanism.

An operation quantity for determining a molding condition such as a resin temperature in the mold, a nozzle temperature, a cylinder temperature, a hopper temperature, a mold clamping force, an injection speed, injection acceleration, an injection peak pressure, an injection stroke, a cylinder tip resin pressure, a reverse protection ring seated state, a switching pressure of holding pressure, a switching speed of holding pressure, a switching position of holding pressure, a holding pressure completion position, a cushion position, a weighing back pressure, weighing torque, a weighing completion position, a screw retreat speed, a cycle time, a mold closing time, an injection time, a pressure holding time, a weighing time, a mold opening time, etc. is set in the molding machine 2, and the molding machine 2 is operated according to the operation quantity. An optimum operation quantity differs depending on the environment of the molding machine 2 and the molded product.

The measurement unit 3 is a device that measures a physical quantity related to molding by the molding machine 2 when the molding is executed. The measurement unit 3 outputs physical quantity data obtained by a measurement process to the operation quantity determination device 1. Examples of the physical quantity include temperature, position, speed, acceleration, current, voltage, pressure, time, image data, torque, force, strain, power consumption, etc.

For example, information measured by the measurement unit 3 includes molded product information, a molding condition (measured value), a peripheral device set value (measured value), atmosphere information, etc. The peripheral device is a device included in a system linked with the molding machine 2, and includes the mold clamping device or the mold. For example, the peripheral device is a molded product take-out device (robot), an insert product insertion device, a nesting insertion device, a foil feeder for in-mold molding, a hoop feeder for hoop molding, a gas injection device for gas assist molding, a gas injection device or a long fiber injection device for foam molding using supercritical fluid, an LIM molding material mixing device, a molded product deburring device, a runner cutting device, a molded product weighing scale, a molded product strength tester, a molded product optical inspection device, a molded product photographing device, an image processing device, a molded product transporting robot, etc.

For example, the molded product information includes information such as a camera image obtained by photographing the molded product, the deformation amount of the molded product obtained by a laser displacement sensor, chromaticity of the molded product obtained by an optical measuring instrument, an optical measured value such as luminance, a weight of the molded product measured by a weighing scale, and the strength of the molded product measured by a strength measuring instrument. The molded product information expresses whether or not the molded product is normal, the defect type, and the defect degree, and is used for calculating a reward.

The molding condition includes information such as a resin temperature in the mold, a nozzle temperature, a cylinder temperature, a hopper temperature, a mold clamping force, an injection speed, injection acceleration, an injection peak pressure, an injection stroke, a cylinder tip resin pressure, a reverse protection ring seated state, a switching pressure of holding pressure, a switching speed of holding pressure, a holding pressure switching position, a completion position of holding pressure, a cushion position, a weighing back pressure, weighing torque, a weighing completion position, a screw retreat speed, a cycle time, a mold closing time, an injection time, a pressure holding time, a weighing time, or a mold opening time measured and obtained using a thermometer, a pressure gauge, a speed measuring instrument, an acceleration measuring instrument, a position sensor, a timer, a weighing scale, etc.

The peripheral device set value includes information such as a mold temperature set as a fixed value, a mold temperature set as a variable value, and the pellet supply amount measured and obtained using a thermometer, a weighing instrument, etc.

The atmosphere information includes information such as an atmosphere temperature, atmosphere humidity, and information related to convection (Reynolds number, etc.) obtained using a thermometer, a hygrometer, a flow meter, etc.

In addition, the measurement unit 3 may measure the mold opening amount, the backflow amount, the tie bar deformation amount, and a heater heating rate.

The operation quantity determination device 1 is a computer and includes a processor 10, a storage 11, an input/output interface (not illustrated), etc. as hardware configurations. The processor 10 includes an arithmetic circuit such as a CPU (Central Processing Unit), a multi-core CPU, a GPU (Graphics Processing Unit), a GPGPU (General-purpose computing on graphics processing units), a TPU (Tensor Processing Unit), an ASIC (Application Specific Integrated Circuit), an FPGA (Field-Programmable Gate Array), or an NPU (Neural Processing Unit), an internal storage device such as a ROM (Read Only Memory) or a RAM (Random Access Memory), an I/O terminal, etc. The processor 10 functions as an initial information acquisition unit 12, a physical quantity acquisition unit 13, a control unit 14, a learner 15, and a map output unit 16 by executing a computer program 11a stored in the storage 11 described later. Each functional unit of the operation quantity determination device 1 may be realized by software, or some or all functional units thereof may be realized by hardware.

The operation quantity determination device 1 may be a server device connected to a network (not illustrated).

The storage 11 is a nonvolatile memory such as a hard disk, an EEPROM (Electrically Erasable Programmable ROM), or a flash memory. The storage 11 stores the computer program 11a for causing the computer to execute an operation quantity determination method according to the first embodiment. Further, the storage 11 stores a state expression map 11b, which will be described later, generated by the learner 15.

The computer program 11a according to the present embodiment may be recorded on a recording medium 4 so as to be readable by the computer. The storage 11 stores the computer program 11a read from the recording medium 4 by a reading device (not illustrated). The recording medium 4 is a semiconductor memory such as a flash memory. Further, the recording medium 4 may be an optical disc such as a CD (Compact Disc)-ROM, a DVD (Digital Versatile Disc)-ROM, or a BD (Blu-ray (registered trademark) Disc). Further, the recording medium 4 may be a flexible disk, a magnetic disk such as a hard disk, a magnetic optical disk, etc. Furthermore, the computer program 11a according to the present embodiment may be downloaded from an external server (not illustrated) connected to a communication network (not illustrated) and stored in the storage 11.

The initial information acquisition unit 12 acquires initial information of the molding machine 2 or the product to be molded, which is a premise for determining the operation quantity of the molding machine 2. The initial information includes, for example, molding machine information, mold information, resin information, etc. The initial information acquisition unit 12 outputs the acquired initial information to the learner 15. The molding machine information includes information indicating a model of the molding machine 2, and types or characteristics of a mold clamping unit, an injection unit, a cylinder, a screw, and a nozzle.

The mold information includes information such as an outer shape of the molded product, the weight of the molded product, the number of samples, the flow length, the thickness of the molded product, the resin pressure, a resin temperature, etc.

The resin information includes information such as a type, a grade, a manufacturer, the viscosity, crystallinity, the vitrification temperature, a melting point, a composite material, etc.

It is difficult to create the state expression map 11b by rigorously digitizing all the initial information, or to construct the state expression map 11b for each piece of initial information. Thus, it is desirable to define required initial information in one-hot expression.

The physical quantity acquisition unit 13 acquires physical quantity data measured by the measurement unit 3 and output when molding by the molding machine 2 is executed. The physical quantity acquisition unit 13 outputs the acquired physical quantity data to the control unit 14.

As illustrated in FIG. 2, the control unit 14 has an observation unit 14a, a reward calculation unit 14b, and an operation quantity correction unit 14c. The physical quantity data output from the measurement unit 3 is input to the observation unit 14a, the reward calculation unit 14b, and the operation quantity correction unit 14c.

The observation unit 14a observes the state of the molding machine 2 by analyzing the physical quantity data, and outputs observation data obtained by observation to a state expression unit 15a of the learner 15. Since the physical quantity data has a large amount of information, the observation unit 14a may generate observation data obtained by compressing information of the physical quantity data. The observation data is information indicating an operation state of the molding machine 2, a state of the molded product, etc.

For example, the observation unit 14a calculates observation data indicating a feature quantity indicating an appearance characteristic of the molded product, the dimensions, area, and volume of the molded product, an optical axis deviation amount of an optical component (molded product), etc. based on a camera image and a measured value of the laser displacement sensor. Further, the observation unit 14a may execute preprocessing on time-series waveform data of the injection speed, injection pressure, holding pressure, etc. and extract the feature quantity of the time-series waveform data as observation data. Time-series data of a time-series waveform and image data representing the time-series waveform may be used as the observation data.

The reward calculation unit 14b calculates reward data, which is a criterion for suitability of the operation quantity in a current state of the molding machine 2, based on the physical quantity data, and outputs the calculated and obtained reward data to the state expression unit 15a of the learner 15.

For example, the reward calculation unit 14b analyzes a camera image and physical quantity data such as measured values of the laser displacement sensor and the weighing scale, thereby calculating a molding result indicating whether or not the molded product is normal, a defect degree, a defect type, etc. Examples of the defect type include warp/deformation, weld line, burr, short, sink mark, void, poor gloss, color unevenness, black spot/contamination, discoloration, flow mark, silver, jetting, reddish brown, etc. The defect degree is a degree of defect, an incidence of defect, etc. Then, the reward calculation unit 14b calculates reward data indicating suitability of the environment of the molding machine 2 and the operation quantity set in the molding machine 2 based on whether the molded product is normal or not and the defect degree. The reward data is, for example, numerical data in which a state where the molded product is normal is 1 and a state where the molded product is defective is less than 1.

The reward data may be the vector quantity representing the state of the molded product for each defect type. For example, the reward data may be the vector quantity in which a state where there is no defect of the defect type is 1 and a state where there is a defect related to the defect type is less than 1 for each defect type.

Further, even though an example of calculating the molding result by analyzing the physical quantity data has been described, a molding result input by an operator may be received by an operation panel having a button, a touch panel, etc.

The operation quantity correction unit 14c corrects the operation quantity output from the learner 15 as necessary, and outputs the corrected operation quantity to the molding machine 2. For example, when the operation quantity is provided with an upper limit, a lower limit, etc., the operation quantity may be corrected so that a value related to a molding condition does not exceed the upper limit or the lower limit.

When correction is unnecessary, the operation quantity correction unit 14c outputs the operation quantity output from the learner 15 to the molding machine 2 without change.

The learner 15 learns the state expression map 11b (environmental model) expressing the state of the molding machine 2, and performs model-based reinforcement learning for determining the operation quantity using the state expression map 11b. As illustrated in FIG. 2, the learner 15 has the state expression unit 15a, a state expression learning unit 15b, and an operation quantity output unit 15c. The storage 11 stores the learned state expression map 11b.

The molding apparatus system according to the first embodiment has a learning phase for learning the state expression map 11b and an operation phase for optimizing the operation quantity using the state expression map 11b and performing molding. The molding apparatus system may receive switching between the learning phase and the operation phase on an operation panel (not illustrated).

Figure 3:
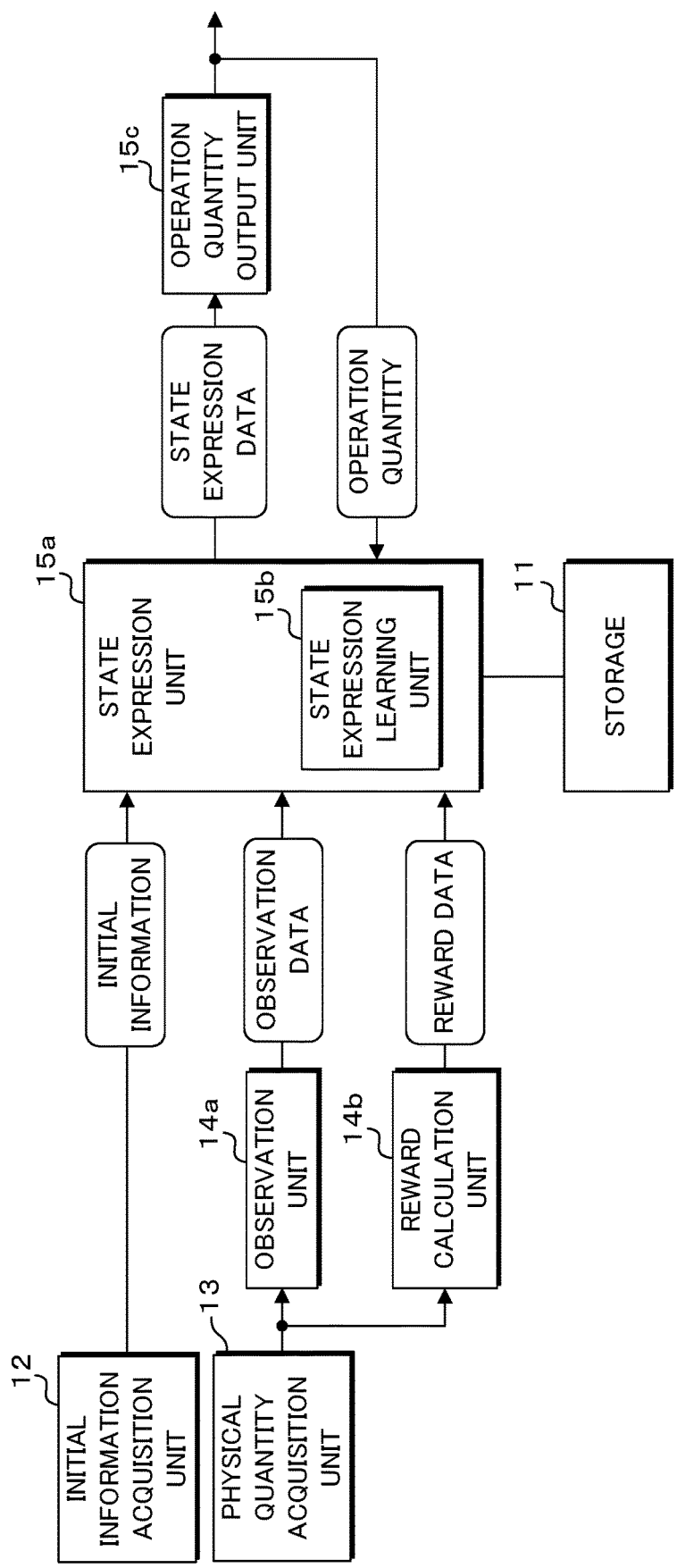
FIG. 3 is a block diagram illustrating a function of a state expression unit and input/output data.

FIG. 3 is a block diagram illustrating a function of the state expression unit 15a and input/output data.

In the case of the learning phase for learning the state expression map 11b, as illustrated in FIG. 3, initial information output from the initial information acquisition unit 12, observation data output from the observation unit 14a, reward data output from the reward calculation unit 14b, and the operation quantity output from the operation quantity output unit 15c are input to the state expression unit 15a. The state expression unit 15a includes the state expression learning unit 15b, and the state expression learning unit 15b learns the state expression map 11b based on the input initial information, observation data, operation quantity, and reward data.

For example, the state expression map 11b is a model that outputs a reward g for setting the operation quantity (action a) in a state s and a state transition probability (certainty) Pt to a next state s' when any initial information and observation data (state s) and the operation quantity (action a) are input. The reward g may be information indicating whether or not a molded product obtained when a certain operation quantity (action a) is set in the state s is normal. It is desirable that the state expression map 11b expresses the state of the molding machine 2 with data having a lower dimension than that of the observation data.

The state expression map 11b may be prepared for each type of initial information.

The state expression learning unit 15b creates or updates the state expression map 11b based on experience data (state s, action a, next state s', reward g) which is learning data or history data. For example, the state expression learning unit 15b may calculate a state transition probability Pt corresponding to a value obtained by dividing the number of visits n to (state s, action a, next state s') by the number of visits Σn to (state s, action a, any next state s'∈S) using the maximum likelihood estimation method, Bayesian estimation, etc. In addition, the state expression unit 15a may calculate a reward g (information indicating the quality of the molded product) corresponding to a value obtained by dividing a reward sum G in (state s, action a) by the number of visits Σn to (state s, action a, any next state s') using the maximum likelihood estimation method, Bayesian estimation, etc.

Further, the state expression map 11b may be configured by using a trained model using a neural network. The neural network has a known configuration having an input layer, one or more hidden layers and an output layer. The state expression learning unit 15b may train the neural network so that when learning data (state s, action a) is input to the neural network, (next state s', reward g), that is, (state transition probability Pt to next state s', reward g) is output from the neural network.

When the number of states represented by an initial state and observation data is enormous, the state and state expression map may be approximated using a parameter having a smaller degree of freedom than that of the state.

In the operation phase in which the molding machine 2 is operated using the created state expression map 11b, initial information, observation data, and the operation quantity output from the operation quantity output unit 15c are input to the state expression unit 15a. The state expression unit 15a inputs initial information indicating a current state, observation data, and the operation quantity to the state expression map 11b, obtains state expression data indicating the state transition probability Pt to the next state s' from the current state and the reward g, and outputs the state expression data to the operation quantity output unit 15c.

Further, the state expression unit 15a outputs the state expression map 11b together with the initial information and the observation data to the map output unit 16 in the learning phase and the operation phase.

The operation quantity output unit 15c determines the operation quantity that maximizes a predetermined objective function based on the state expression data output from the state expression unit 15a, and outputs the determined operation quantity to the operation quantity correction unit 14c and the state expression unit 15a. For example, the operation quantity output unit 15c determines the operation quantity using a known method such as a dynamic programming method such as a value iterative method, or a linear programming method.

Figure 4:
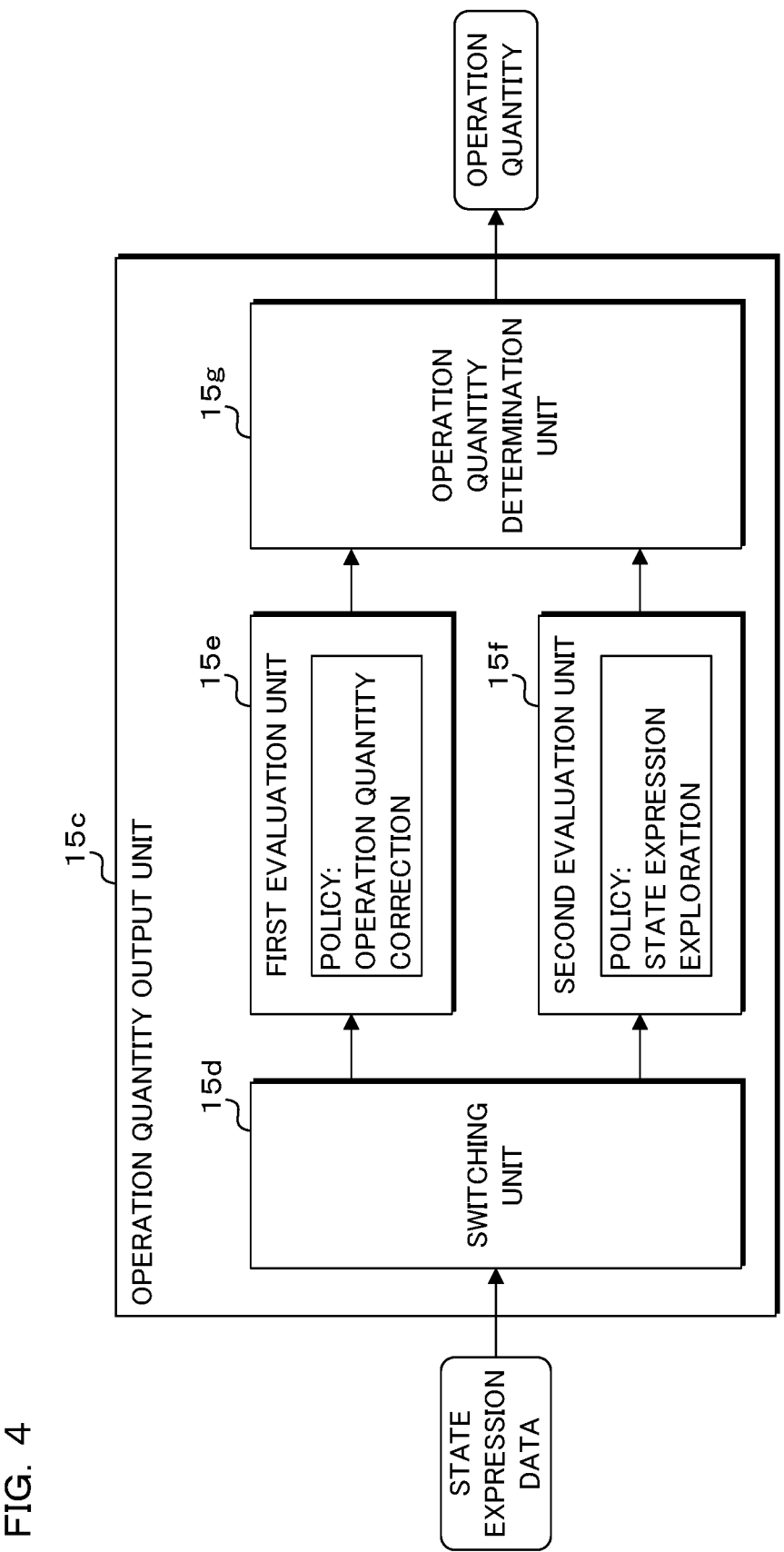
FIG. 4 is a block diagram illustrating a function of an operation quantity output unit and input/output data.

FIG. 4 is a block diagram illustrating a function of the operation quantity output unit 15c and input/output data. The operation quantity output unit 15c includes a switching unit 15d, a first evaluation unit 15e, a second evaluation unit 15f, and an operation quantity determination unit 15g.

The switching unit 15d outputs the state expression data to the first evaluation unit 15e in the operation phase, and outputs the state expression data to the second evaluation unit 15f in the learning phase.

The first evaluation unit 15e has a first objective function for adjusting the operation quantity so that a normal molded product may be obtained. By inputting state expression data and the operation quantity to the first objective function, the first evaluation unit 15e calculates an evaluation value which is an expected return (discount cumulative reward). The expected return is an expected value of the sum of rewards that will be obtained in the future.

The second evaluation unit 15f has a second objective function for adjusting the operation quantity so that the state of the molded product changes in order to explore for the state expression map 11b. By inputting state expression data and the operation quantity to the second objective function, for example, the second evaluation unit 15f calculates an evaluation value that increases as a molding result for the state and operation quantity of the molding machine 2 is more unknown, that is, as the number of trials decreases. The second evaluation unit 15f may calculate the evaluation value using a exploration method such as the so-called ε-greedy method or UCB1.

The operation quantity determination unit 15g determines the operation quantity that maximizes the evaluation value calculated by the first evaluation unit 15e in the operation phase, and determines the operation quantity that maximizes the evaluation value calculated by the second evaluation unit 15f in the learning phase. The operation quantity output unit 15c outputs the operation quantity determined by the operation quantity determination unit 15g to the state expression unit 15a and the operation quantity correction unit 14c.

The operation quantity determination unit 15g may determine the operation quantity so that the change amount of the operation quantity per step in the learning phase is larger than the change amount of the operation quantity per step in the operation phase. Further, the operation quantity determination device 1 may be configured to receive the setting of the change amount of the operation quantity per step from an operator on an operation panel (not illustrated). When updating the state expression map 11b, the operation quantity determination unit 15g changes the operation quantity according to the received change amount, explores for the state expression map 11b, and updates the state expression map 11b. When models of the mold, the molding machine 2, and the peripheral device, and physical properties of the resin change significantly, it is advisable to set a large change amount of the operation quantity in the learning phase.

The map output unit 16 includes a map image generation unit 16a, a plotting unit 16b, and a display processing unit 16c.

Figure 5:
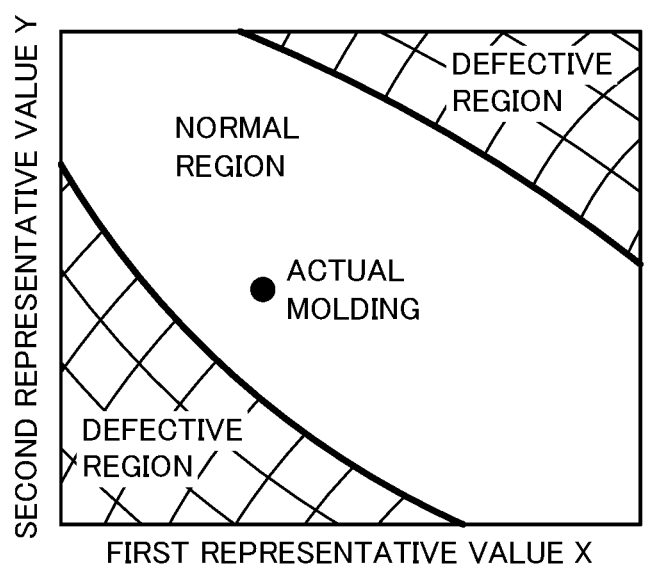
FIG. 5 is a schematic diagram illustrating an example of a map image.
Figure 6:
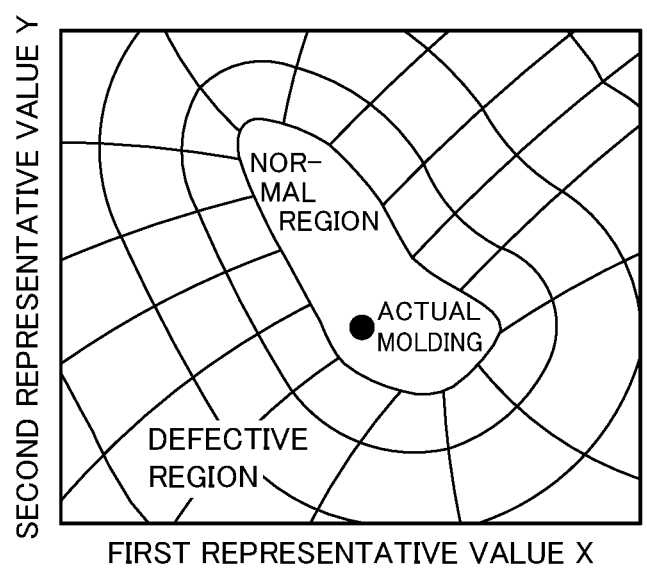
FIG. 6 is a schematic diagram illustrating another example of a map image.

The map image generation unit 16a generates a map image that visualizes the state expression map 11b (see FIGS. 5 and 6). For example, the map image generation unit 16a may generate a function f(X, Y) based on the state expression map 11b. For example, (X, Y) denotes representative values obtained by approximating a state (initial information and observation data) and operation quantity of the molding machine 2 in two dimensions. That is, the representative values (X, Y) are information indicating a molding condition, environment, etc. set in the molding machine 2. The function f is a function that returns a value indicating whether a molded product obtained when the operation quantity in a certain state is set in the molding machine 2 is normal or defective. The value indicating whether or not the molded product is normal is, for example, a value corresponding to reward data output when the state and the operation quantity are input to the state expression map 11b. The function f(X, Y) may be visualized, for example, on a contour map.

The plotting unit 16b executes a process of plotting a state (X1, Y1) when molding is actually performed on the map image (see FIGS. 5 and 6). Further, the plotting unit 16b executes a process of distinguishably displaying whether or not the reward obtained when the molding is actually performed, that is, the molded product is normal in different plotted images (see FIG. 7). Further, the plotting unit 16b executes a process of plotting a plurality of states (X1, Y1), (X2, Y2), . . . on a map image when the actual molding is performed a plurality of times, and displaying an image showing a direction of change in the state, for example, a change in the center of gravity of a plot group on a map image as an arrow image (see FIG. 8).

The display processing unit 16c executes a process of displaying the map image, a map image plotting a state when actual molding is performed, etc. on a display unit (not illustrated).

FIG. 5 is a schematic diagram illustrating an example of a map image. In the figure, a horizontal axis and a vertical axis indicate the above-mentioned representative values (X, Y). In FIG. 5, a thick line indicates a boundary between a molding condition in which a normal molded product is obtained and a molding condition in which a defective molded product is obtained. Hereinafter, the state (initial information and observation data) and the operation quantity are simply referred to as molding conditions. Further, on the map image, a line segment indicating the boundary between the molding condition in which the normal molded product is obtained and the molding condition in which the defective molded product is obtained is simply referred to as a boundary line.

For example, the map image generation unit 16a may color-code and display a molding condition in which a normal molded product is obtained when a value of the function f is equal to or more than a predetermined threshold value, and a molding condition in which a defective product is obtained when a value of the function f is less than the predetermined threshold value in two colors. The color coding by two colors is an example, and any other known method may be used as long as a molding condition in which a normal molded product is obtained and a molding condition in which a defective molded product is obtained are displayed in different modes.

In FIG. 5, a black circle indicates a molding condition when the molding is actually performed.

FIG. 6 is a schematic diagram illustrating another example of a map image. As in FIG. 5, a horizontal axis and a vertical axis indicate the representative values (X, Y). In FIG. 6, the normality, the defect, and the degree of the defect of the molded product are displayed in a contour diagram. Specifically, the map image generation unit 16a generates a contour diagram based on the reward g.

Figure 7:
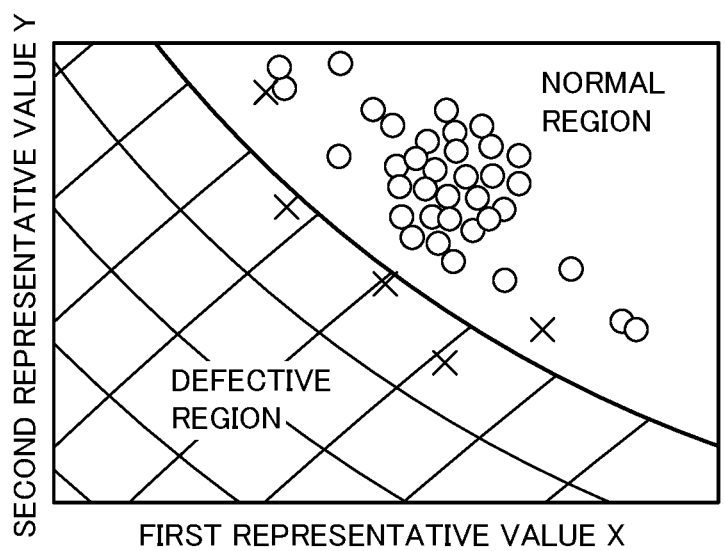
FIG. 7 is a schematic diagram illustrating another example of a map image.

FIG. 7 is a schematic diagram illustrating another example of a map image. As in FIG. 5, a horizontal axis and a vertical axis indicate the representative values (X, Y). In FIG. 7, an upper right portion (normal region) indicates a molding condition in which a normal molded product is obtained, and a lower left portion (defective region) indicates a molding condition in which a normal molded product is not obtained.

Plotted circle marks and X-marks indicate molding conditions when molding was actually performed a plurality of times in the past at positions on the map image, and indicate whether or not molded products are normal as plotted images. A circle mark indicates that a normal molded product is obtained, and a plotted X-mark indicates that a normal molded product is not obtained.

As illustrated in FIG. 7, it may be seen that even in a molding condition in which a normal molded product is obtained, molding defect occurs when molding is actually performed.

In FIG. 7, the plotted circle mark and the plotted X-mark are examples of a plotted image indicating whether or not the molded product is normal. Other graphic images and character images may be used as long as it is possible to indicate whether or not the molded product is normal or the degree of defect of the molded product. Further, a state of the molded product may be represented by color coding.

Figure 8:
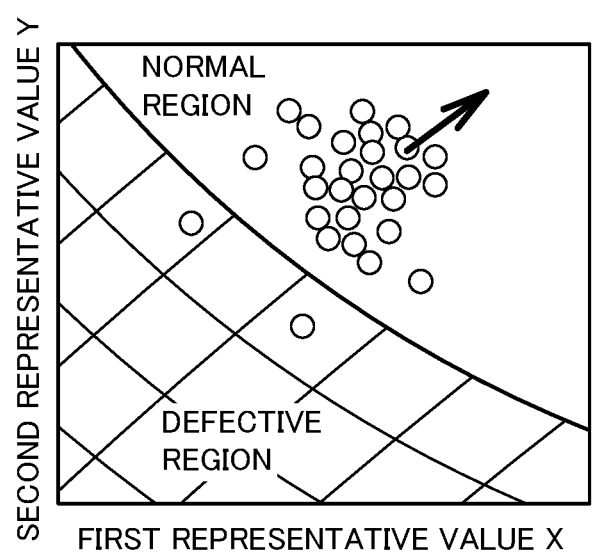
FIG. 8 is a schematic diagram illustrating another example of a map image.

FIG. 8 is a schematic diagram illustrating another example of a map image. As in FIG. 7, a horizontal axis and a vertical axis indicate the representative values (X, Y). Plotted circle marks indicate molding conditions when molding was actually performed a plurality of times in the past. Further, the plotting unit 16b superimposes and displays a locus of change in molding condition, in other words, a history of change of a center of gravity of a molding condition group, as an arrow image on the map image. More specifically, it is preferable to calculate a time average speed of the center of gravity on the map image for plotting actual molding and superimpose and display an arrow image indicating the average speed on the map image.

Figure 9:
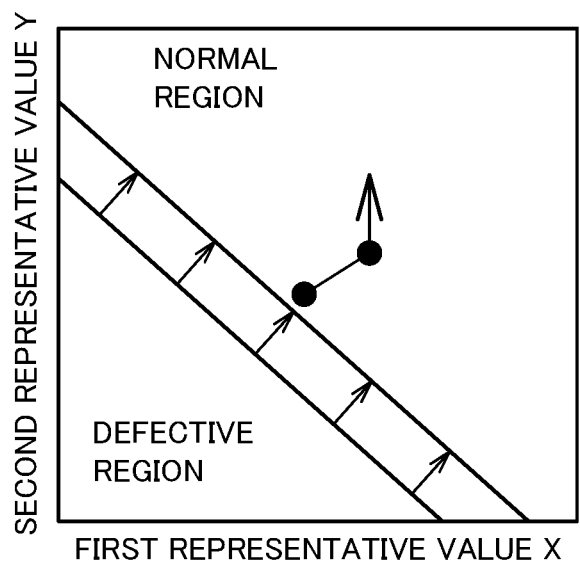
FIG. 9 is a schematic diagram illustrating another example of a map image.

FIG. 9 is a schematic diagram illustrating another example of a map image. The map image generation unit 16a may display a history of change in molding condition in a learning process of the state expression map 11b and a change in boundary line on the map image.

When learning the state expression map 11b, the learner 15 exploratively changes the molding condition in order to explore for an environmental model. The plotting unit 16b superimposes and displays a molding condition in the learning process of the state expression map 11b on the map image. In addition, an arrow image indicating a change in molding condition is displayed.

Further, when a position of the boundary line changes in the learning process, the map image generation unit 16a superimposes the boundary line before learning and the boundary line after learning on the map image. Further, the map image generation unit 16a displays an arrow image indicating a changing direction of the boundary line on the map image.

Figure 10:
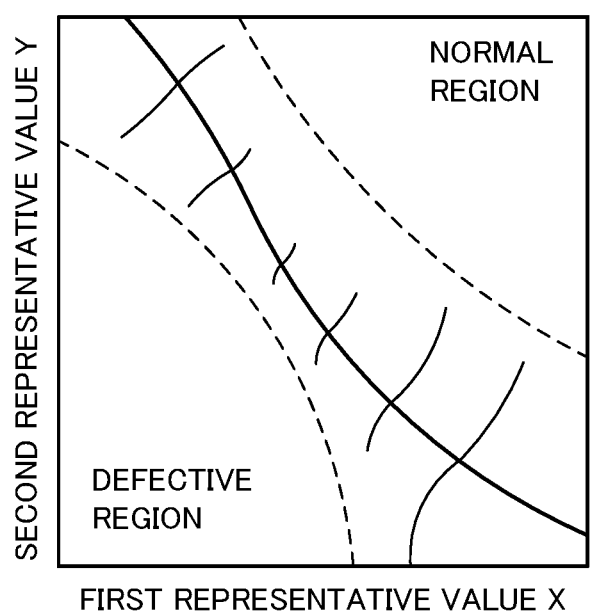
FIG. 10 is a schematic diagram illustrating another example of a map image.

FIG. 10 is a schematic diagram illustrating another example of a map image. A thick and solid line indicates a boundary line in the map image. A broken line indicates a confidence interval of the boundary line.

It is obvious that the confidence interval may be displayed on the state expression map 11b illustrated in FIGS. 5 to 9 above.

In FIGS. 5 to 10, an example of displaying a state where a normal molded product is obtained and a state where a defective product is obtained has been described. However, it is possible to display a state where a defective product is obtained so that a defect type of the defective product is distinguishable.

For example, reward data is set as a vector quantity representing a state of a molded product for each defect type, and the state expression map 11b is configured to output reward data which is a vector quantity when a state and the operation quantity are input. Further, the function f(X, Y) may be a function that returns a value (f1, f2, f3, . . . fN) indicating a state of a molded product obtained when the operation quantity in a certain state is set in the molding machine 2 for each defect type. fi (i is a natural number of 1 to N indicating a defect type) is a numerical value indicating, for example, whether or not a defect related to the defect type i is in a state where the defect may appear in the molded product. fi=1 corresponds to a state where the defect of the defect type does not appear, and f1=0 indicates a state where the defect of the defect type appears.

The map image generation unit 16a generates a map image on which a molding condition indicated by the representative values (X, Y) is displayed so that a state where a normal molded product is obtained and a plurality of states in which defects of respective defect types appear are distinguishable based on the values of f1, f2, . . . fN.

With this configuration, the operator may visually recognize from the map image what sort of defect type is likely to appear.

Figure 11:
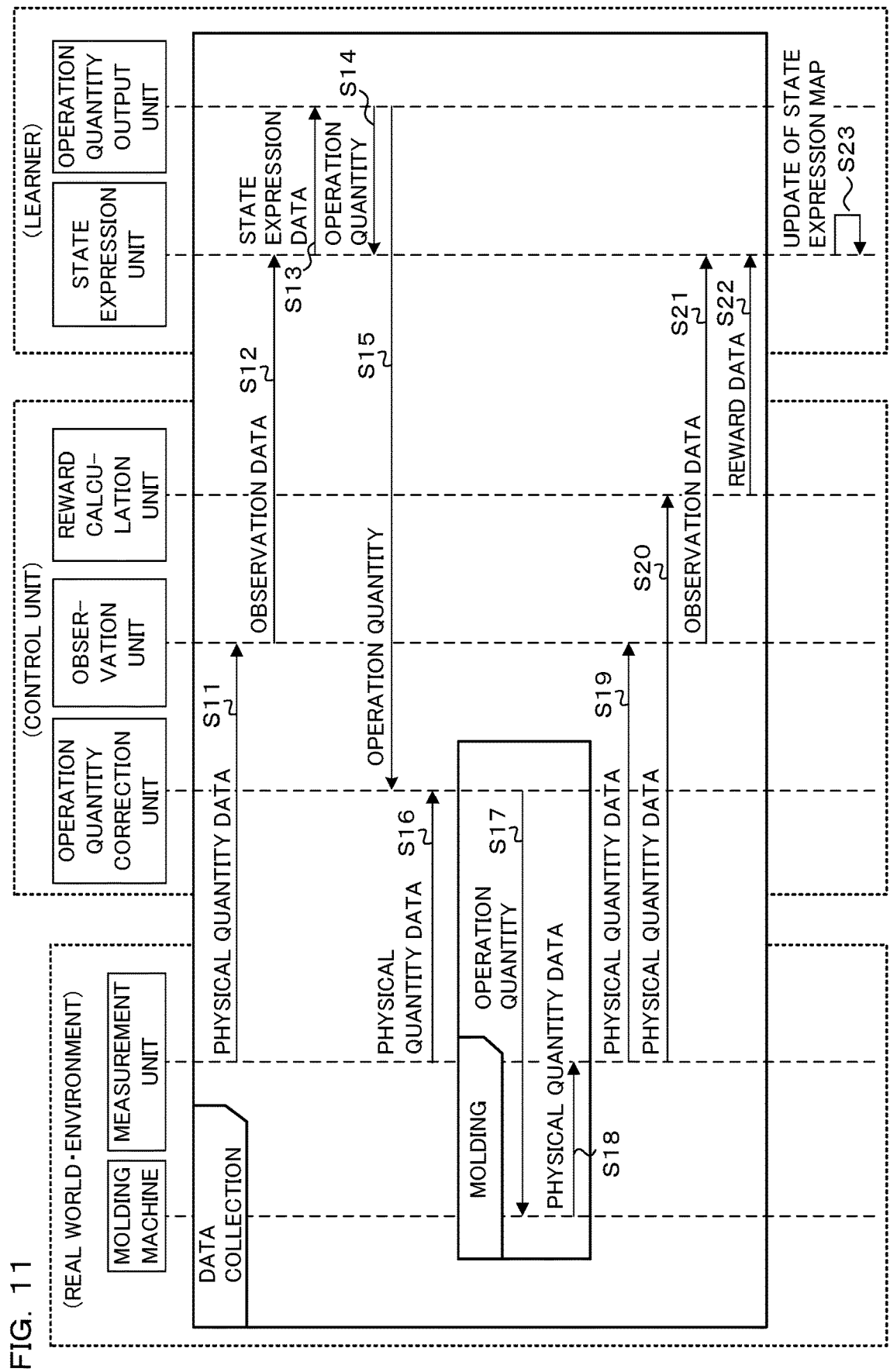
FIG. 11 is a sequence diagram illustrating an operation of an operation quantity determination device in a learning phase.

FIG. 11 is a sequence diagram illustrating an operation of the operation quantity determination device 1 in the learning phase. In FIG. 11, a part surrounded by a dotted line on the left side indicates an environment in the real world, that is, an operation of the molding machine 2 and a measurement operation by the measurement unit 3. A part surrounded by a broken line in the center indicates a processing operation of the control unit 14, and a part surrounded by a broken line on the right side indicates a processing operation of the learner 15.

When the molding machine 2 executes molding, the measurement unit 3 measures a physical quantity related to the molding machine 2 and the molded product, and outputs physical quantity data obtained by measurement to the observation unit 14a (step S11).

The observation unit 14a acquires the physical quantity data output from the measurement unit 3, generates observation data based on the acquired physical quantity data, and outputs the generated observation data to the state expression unit 15a (step S12).

The state expression unit 15a acquires the observation data output from the observation unit 14a, applies the observation data, an initial state, etc. to the state expression map 11b to create state expression data, and outputs the created state expression data to the operation quantity output unit 15c (step S13).

The operation quantity output unit 15c determines the operation quantity of the molding machine 2 based on the state expression data output from the state expression unit 15a, and outputs the determined operation quantity to the state expression unit 15a and the operation quantity correction unit 14c (step S14 and step S15). For example, the operation quantity output unit 15c determines the operation quantity that maximizes an evaluation value obtained from the second objective function as described above.

Similar to step S11, the measurement unit 3 outputs the physical quantity data obtained by measurement to the operation quantity correction unit 14c (step S16). The operation quantity correction unit 14c corrects the operation quantity as necessary based on the physical quantity data, and outputs the corrected operation quantity to the molding machine 2 (step S17). The molding machine 2 sets the operation quantity and performs a molding process according to the operation quantity. The physical quantity related to the operation of the molding machine 2 and the molded product are input to the measurement unit 3 (step S18). The molding process may be repeated a plurality of times.

The measurement unit 3 measures the physical quantity related to the molding machine 2 and the molded product when the molding machine 2 executes molding, and outputs physical quantity data obtained by measurement to the observation unit 14*a* and the reward calculation unit 14*b* (step S19 and step S20).

The observation unit 14*a* acquires the physical quantity data output from the measurement unit 3, generates observation data based on the acquired physical quantity data, and outputs the generated observation data to the state expression unit 15*a* (step S21).

The reward calculation unit 14*b* calculates reward data determined according to whether or not the molded product is normal and a degree of defect based on the physical quantity data measured by the measurement unit 3, and outputs the calculated reward data to the state expression unit 15*a* (step S22).

The state expression learning unit 15*b* of the state expression unit 15*a* updates a state expression model based on observation data output from the observation unit 14*a*, reward data output from the reward calculation unit 14*b*, the operation quantity output from the operation quantity output unit 15*c*, and initial information (step S23). The state expression learning unit 15*b* may update the state expression model using, for example, the maximum likelihood estimation method, Bayesian estimation, etc.

Figure 12:
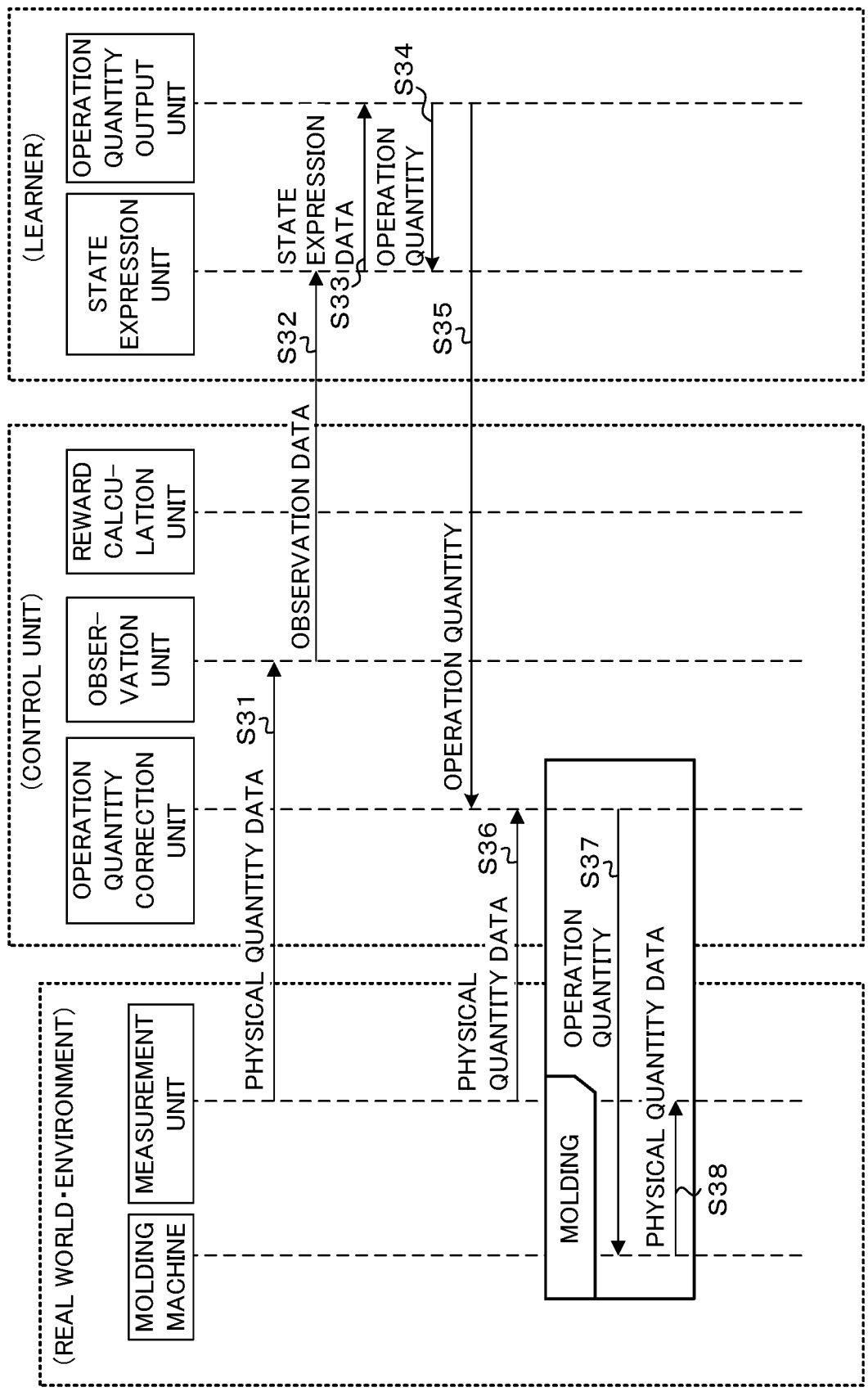
FIG. 12 is a sequence diagram illustrating an operation of the operation quantity determination device in an operation phase.

FIG. 12 is a sequence diagram illustrating an operation of the operation quantity determination device 1 in the operation phase. The measurement unit 3 measures the physical quantity related to the molding machine 2 and the molded product when the molding machine 2 executes molding, and outputs physical quantity data obtained by measurement to the observation unit 14*a* (step S31).

The observation unit 14*a* acquires the physical quantity data output from the measurement unit 3, generates observation data based on the acquired physical quantity data, and outputs the generated observation data to the state expression unit 15*a* (step S32).

The state expression unit 15*a* acquires the observation data output from the observation unit 14*a*, applies the observation data and an initial state etc. to the state expression map 11*b* to create state expression data, and outputs the created state expression data to the operation quantity output unit 15*c* (step S33).

The operation quantity output unit 15*c* determines the operation quantity of the molding machine 2 based on the state expression data output from the state expression unit 15*a*, and outputs the determined operation quantity to the state expression unit 15*a* and the operation quantity correction unit 14*c* (step S34 and step S35). For example, the operation quantity output unit 15*c* determines the operation quantity that maximizes an expected return (discount cumulative reward) obtained from the first objective function as described above.

Similar to step S31, the measurement unit 3 outputs the physical quantity data obtained by measurement to the operation quantity correction unit 14*c* (step S36). The operation quantity correction unit 14*c* corrects the operation quantity as necessary based on the physical quantity data, and outputs the corrected operation quantity to the molding machine 2 (step S37). The molding machine 2 sets the operation quantity and performs a molding process according to the operation quantity. A physical quantity related to the operation of the molding machine 2 and the molded product is input to the measurement unit 3 (step S38).

When the environment in which the molding apparatus system is operated changes, the operator may appropriately switch an operation mode from the operation phase to the learning phase and update the state expression map 11*b*. The operation quantity determination device 1 switched from the operation phase to the learning phase may update the state expression map 11*b* by executing the process illustrated in FIG. 11.

Even when the environment changes, content of the state expression map 11*b* does not change dramatically, and in many cases, it suffices to correct a boundary part between a molding condition in which a normal molded product is obtained and a molding condition in which a defective molded product is obtained. Therefore, the operation quantity output unit 15*c* explores for a region in which the state expression map 11*b* needs to be updated by outputting the operation quantity related to the vicinity of the boundary. Further, the operation quantity output unit 15*c* may start exploring for the state expression map 11*b* by using the operation quantity corresponding to the vicinity of the boundary line on the map image. Then, the state expression learning unit 15*b* updates the state expression map 11*b* based on experience data or history data obtained in a process of the exploration.

According to the molding apparatus system, an operation quantity calculation device, an operation quantity calculation method, and the computer program 11*a* according to the first embodiment, it is possible to perform additional learning excellent in robustness against environmental changes and for adapting to a new environment in a short time.

According to the first embodiment, the operation quantity determination device 1 may generate the state expression map 11*b* in consideration of initial information related to the molding machine 2 or the molded product.

According to the first embodiment, even when the environment changes, the state expression map 11*b* may be updated to cope with the change in the environment.

According to the first embodiment, the state expression map 11*b* may be efficiently updated by outputting the operation quantity that changes the molding result in the learning phase.

According to the first embodiment, when the state expression map 11*b* is explored in the learning phase, the state expression map 11*b* may be efficiently updated by increasing a fluctuation range of the operation quantity.

According to the first embodiment, the policy for determining the operation quantity may be changed between the learning phase and the operation phase. In the learning phase, the state expression map 11*b* may be efficiently updated, and in the operation phase, the operation quantity may be efficiently adjusted to a state where the molded product is obtained.

According to the first embodiment, the map output unit 16 may visualize and display the state expression map 11*b* as a map image. The map image may distinguishably display a molding condition in which a normal molded product is obtained and a molding condition in which a defective molded product is obtained.

Further, the map output unit 16 may plot and display a current molding condition actually performed on the state expression map 11*b*.

Further, the map output unit 16 may display whether a molded product actually obtained under a molding condition is normal or defective as different plotted image. The operator may intuitively recognize whether or not a current molding condition is in a state where a normal molded product is obtained, and a degree at which the current molding condition is away from a state where a normal molded product is obtained.

Furthermore, the map output unit 16 may display a boundary line between a state where a normal molded product is obtained and a state where a molded product is defective, and display a change of the boundary line due to learning of the state expression map 11b on a map image. The operator may intuitively recognize a learning status of the state expression map 11b.

Second Embodiment

A molding machine according to a second embodiment is different from that of the first embodiment in that an operation quantity determination device is provided in the molding machine. Therefore, the difference will be mainly described below. Since other configurations, actions, and effects are similar to those in the first embodiment, the corresponding parts are designated by similar reference symbols and detailed description thereof will be omitted.

Figure 13:
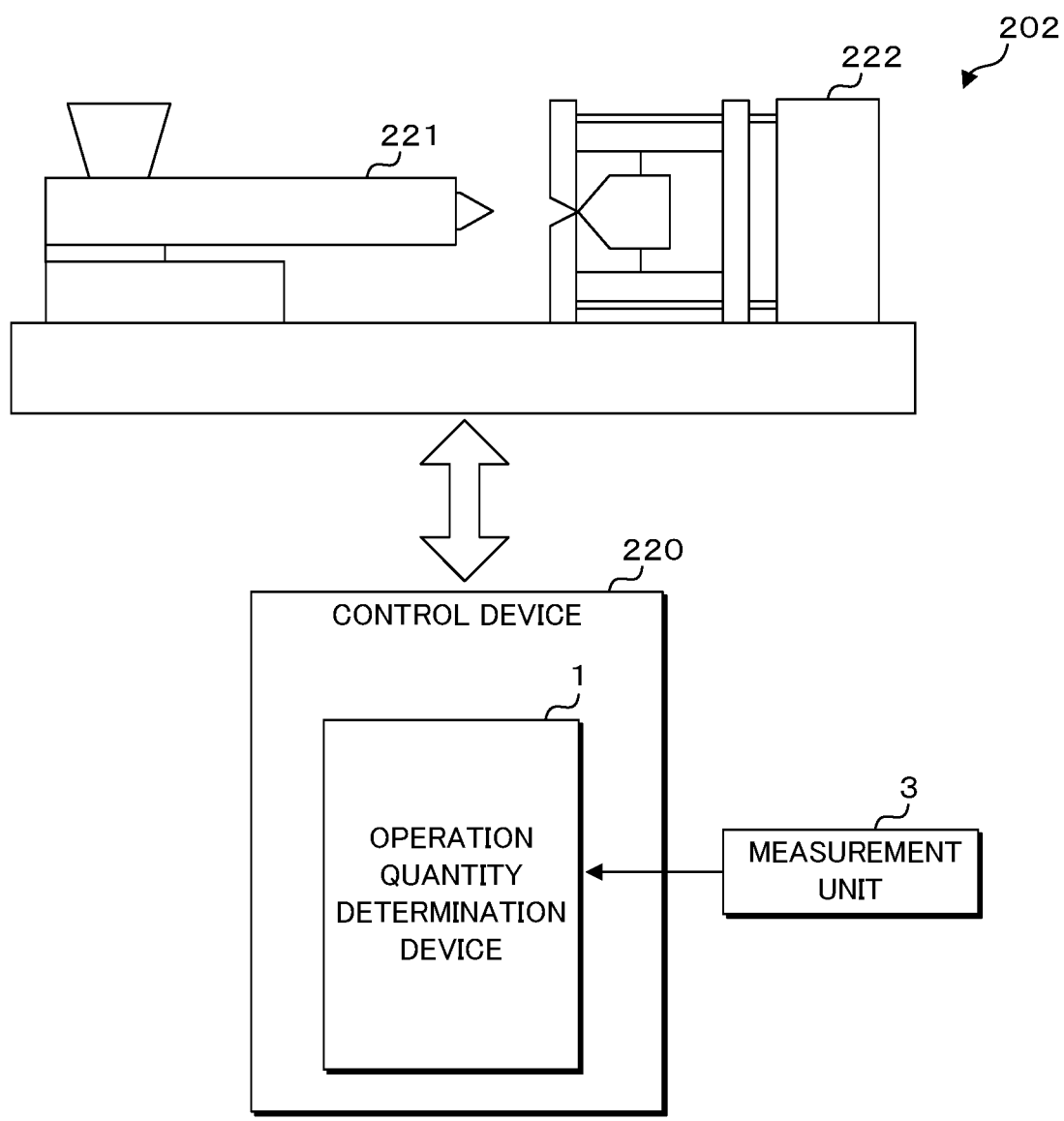
FIG. 13 is a block diagram illustrating a molding machine according to a second embodiment.

FIG. 13 is a block diagram illustrating a molding machine 202 according to the second embodiment. The molding machine 202 according to the second embodiment includes an injection device 221, a mold clamping device 222 disposed in front of the injection device 221, and a control device 220 for controlling the operation of the molding machine 202. The control device 220 includes the operation quantity determination device 1 described in the first embodiment.

According to the molding machine 202 according to the second embodiment, the molding machine 202 may learn the state expression map 11b by itself, determine the operation quantity for reducing a defect degree, and operate based on the determined operation quantity.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An operation quantity determination device for determining an operation quantity related to a molding machine, the device comprising:
   a processor; and
   a storage storing instructions for causing the processor to execute processes of:
   acquiring observation data obtained by observing a physical quantity related to molding by the molding machine;
   generating a state expression map expressing a state of the molding machine based on the acquired observation data; and
   outputting the operation quantity based on the generated state expression map,
   wherein the state expression map is a model that outputs a reward for setting the operation quantity in a state and a state transition probability to a next state when an initial information and the observation data and an operation quantity are input.

2. The operation quantity determination device according to claim 1, wherein the storage stores instructions for causing the processor to acquire initial information including molding machine information, mold information or resin information, and
   the processor is configured to generate the state expression map expressing the state based on the observation data and the initial information.

3. The operation quantity determination device according to claim 1, wherein the storage stores the state expression map and instructions for causing the processor to execute processes of:
   calculating reward data representing a molding result by the molding machine based on the observation data; and
   updating the state expression map based on the observation data and the reward data.

4. The operation quantity determination device according to claim 3, wherein the processor is configured to output the operation quantity changing the molding result by the molding machine when the state expression map is updated.

5. The operation quantity determination device according to claim 4, wherein the instructions to output the operation quantity comprises:
   a first instruction for causing the processor to calculate a higher evaluation value for the operation quantity as a probability of transitioning to a state where a normal molded product is obtained is higher; and
   a second instruction for causing the processor to calculate a higher evaluation value for an operation quantity as a molding result for a state and the operation quantity of the molding machine is more unknown;
wherein the instructions to output the operation quantity comprises instructions for causing the processor to execute processes of:
   switching the first instruction or the second instruction used for determining the operation quantity; and
   determining the operation quantity based on an evaluation value output by the first instruction or the second instruction.

6. The operation quantity determination device according to claim 1, wherein the storage stores instructions for causing the processor to display the state expression map and an actual molding result by the molding machine so that the state expression map and the actual molding result are allowed to be compared with each other.

7. A molding apparatus system, comprising:
   the operation quantity determination device according to claim 1; and
   a molding machine.

8. A molding machine, comprising the operation quantity determination device according to claim 1,
   wherein the molding machine is configured to operate based on the operation quantity determined by the operation quantity determination device.

9. A non-transitory computer readable recording medium storing a computer program for causing a computer to determine an operation quantity related to a molding machine, the computer program causing the computer to execute processes of:
   acquiring observation data obtained by observing a physical quantity related to molding by the molding machine when the molding is executed;
   generating a state expression map expressing a state of the molding machine based on the acquired observation data; and
   outputting the operation quantity based on the generated state expression map, wherein the state expression map is a model that outputs a reward for setting the operation quantity in a state and a state transition probability to a next state when an initial information and the observation data and an operation quantity are input.

10. An operation quantity determination method for determining an operation quantity related to a molding machine, the method comprising:

acquiring observation data obtained by observing a physical quantity related to molding by the molding machine when the molding is executed;

generating a state expression map expressing a state of the molding machine based on the acquired observation data; and outputting the operation quantity based on the generated state expression map, wherein the state expression map is a model that outputs a reward for setting the operation quantity in a state and a state transition probability to a next state when an initial information and the observation data and an operation quantity are input.

11. A state display device, comprising:

a processor; and a storage storing instructions for causing the processor to execute processes of:

acquiring observation data obtained by observing a physical quantity related to molding by a molding machine when the molding is executed; and displaying a map image related to a state expression map expressing a state of the molding machine based on the observation data and an actual molding result by the molding machine so that the map image and the actual molding result are allowed to be compared with each other.

12. The state display device according to claim 11, wherein the map image includes an image distinguishably representing a state where a normal molded product is obtained and a state where a defective molded product is obtained.

13. The state display device according to claim 11, wherein the storage stores instructions for causing the processor to display, on the map image, a plotted image indicating a state where actual molding by the molding machine is performed.

14. The state display device according to claim 13, wherein the processor is configured to display, on the map image, the plotted image differing depending on whether or not a molded product obtained by actual molding is normal.

15. The state display device according to claim 14, wherein, the processor is configured to display, when actual molding is performed, on the map image, a plurality of plotted images each indicating a state where the molding is performed and an image indicating a change of the plotted image displayed on the map image.

16. The state display device according to claim 11, wherein the storage stores instructions for causing the processor to execute processes of:

Displaying, on the map image, a boundary line indicating a boundary between a state where a normal molded product is obtained and a state where a defective molded product is obtained; and displaying the boundary line before the state expression map is updated and the boundary line after the state expression map is updated when the state expression map is updated.

17. An operation quantity determination device for determining an operation quantity related to a molding machine, the device comprising:

a processor; and a storage storing instructions for causing the processor to execute processes of:

acquiring observation data obtained by observing a physical quantity related to molding by the molding machine;

generating a state expression map expressing a state of the molding machine based on the acquired observation data; and outputting the operation quantity based on the generated state expression map, wherein the storage stores the state expression map and instructions for causing the processor to execute processes of:

calculating reward data representing a molding result by the molding machine based on the observation data; and updating the state expression map based on the observation data and the reward data, wherein the processor is configured to output the operation quantity changing the molding result by the molding machine when the state expression map is updated, wherein the instructions to output the operation quantity comprises:

a first instruction for causing the processor to calculate a higher evaluation value for the operation quantity as a probability of transitioning to a state where a normal molded product is obtained is higher; and a second instruction for causing the processor to calculate a higher evaluation value for an operation quantity as a molding result for a state and the operation quantity of the molding machine is more unknown;

wherein the instructions to output the operation quantity comprises instructions for causing the processor to execute processes of:

switching the first instruction or the second instruction used for determining the operation quantity; and determining the operation quantity based on an evaluation value output by the first instruction or the second instruction.

18. A non-transitory computer readable recording medium storing a computer program for causing a computer to determine an operation quantity related to a molding machine, the computer program causing the computer to execute processes of:

acquiring observation data obtained by observing a physical quantity related to molding by the molding machine when the molding is executed;

generating a state expression map expressing a state of the molding machine based on the acquired observation data; and outputting the operation quantity based on the generated state expression map, wherein the non-transitory computer readable recording medium is configured to cause the computer to store the state expression map and the computer program further causes the computer to execute processes of:

calculating reward data representing a molding result by the molding machine based on the observation data; and updating the state expression map based on the observation data and the reward data, wherein the non-transitory computer readable recording medium is configured to cause the computer to output the operation quantity changing the molding result by the molding machine when the state expression map is updated, and wherein the computer program further causes the computer to execute processes of:
calculating a higher evaluation value for the operation quantity as a probability of transitioning to a state where a normal molded product is obtained is higher, based on a first instruction; and
calculating a higher evaluation value for an operation quantity as a molding result for a state and the operation quantity of the molding machine is more unknown, based on a second instruction;

wherein outputting the operation quantity comprises causing the computer to execute processes of:
switching the first instruction or the second instruction used for determining the operation quantity; and
determining the operation quantity based on an evaluation value output by the first instruction or the second instruction.

19. An operation quantity determination method for determining an operation quantity related to a molding machine, the method comprising:
acquiring observation data obtained by observing a physical quantity related to molding by the molding machine when the molding is executed;
generating a state expression map expressing a state of the molding machine based on the acquired observation data;
outputting the operation quantity based on the generated state expression map;
calculating reward data representing a molding result by the molding machine based on the observation data;
updating the state expression map based on the observation data and the reward data; and
outputting the operation quantity changing the molding result by the molding machine when the state expression map is updated;

wherein outputting the operation quantity comprises:
calculating a higher evaluation value for the operation quantity as a probability of transitioning to a state where a normal molded product is obtained is higher based on a first instruction; and
calculating a higher evaluation value for an operation quantity as a molding result for a state and the operation quantity of the molding machine is more unknown based on a second instruction;

wherein outputting the operation quantity comprises:
switching the first instruction or the second instruction used for determining the operation quantity; and
determining the operation quantity based on an evaluation value output by the first instruction or the second instruction.

20. An operation quantity determination device for determining an operation quantity related to a molding machine, the device comprising:
a processor; and
a storage storing instructions for causing the processor to execute processes of:
acquiring observation data obtained by observing a physical quantity related to molding by the molding machine;
generating a state expression map expressing a state of the molding machine based on the acquired observation data; and
outputting the operation quantity based on the generated state expression map,
wherein the storage stores instructions for causing the processor to display the state expression map and an actual molding result by the molding machine so that the state expression map and the actual molding result are allowed to be compared with each other.

21. A non-transitory computer readable recording medium storing a computer program for causing a computer to determine an operation quantity related to a molding machine, the computer program causing the computer to execute processes of:
acquiring observation data obtained by observing a physical quantity related to molding by the molding machine when the molding is executed;
generating a state expression map expressing a state of the molding machine based on the acquired observation data; and
outputting the operation quantity based on the generated state expression map,
wherein the computer program further causes the computer to display the state expression map and an actual molding result by the molding machine so that the state expression map and the actual molding result are allowed to be compared with each other.

22. An operation quantity determination method for determining an operation quantity related to a molding machine, the method comprising:
acquiring observation data obtained by observing a physical quantity related to molding by the molding machine when the molding is executed;
generating a state expression map expressing a state of the molding machine based on the acquired observation data; and
outputting the operation quantity based on the generated state expression map,
displaying the state expression map and an actual molding result by the molding machine so that the state expression map and the actual molding result are allowed to be compared with each other.

* * * * *